United States Patent [19]

Kuykendall

[11] 4,266,568
[45] May 12, 1981

[54] VACUUM BREAKER-PRESSURE RELEASE DEVICE

[76] Inventor: John R. Kuykendall, 122 C.C. Santos St., B.F. Homes, Paranaque, Metro Manila, Philippines

[21] Appl. No.: 120,077

[22] Filed: Feb. 7, 1980

[30] Foreign Application Priority Data

Jun. 26, 1979 [PH] Philippines .............. UM-5720

[51] Int. Cl.³ ........................................ F16K 17/194
[52] U.S. Cl. .............................. 137/493.8; 137/533; 137/533.31; 220/204
[58] Field of Search ............... 137/493.8, 493.9, 533, 137/533.31, 541; 220/203, 204

[56] References Cited

U.S. PATENT DOCUMENTS

| 2,589 | 4/1842 | Creasey | 251/368 X |
|---|---|---|---|
| 325,273 | 9/1885 | Richardson | 251/368 X |
| 718,771 | 1/1903 | Kerfoot | 137/533.31 |
| 1,628,069 | 5/1927 | Schmidt | 137/493.9 X |
| 1,669,739 | 5/1928 | Clark | 137/493.8 |
| 1,918,807 | 7/1933 | Glab | 137/493.8 X |
| 1,997,116 | 4/1935 | Nielsen | 137/541 X |
| 2,226,022 | 12/1940 | Shutts | 137/493.8 X |
| 3,235,225 | 2/1966 | Dickinson | 137/493.9 X |
| 3,999,571 | 12/1976 | Pedersen | 220/203 X |

FOREIGN PATENT DOCUMENTS 745266 2/1956 United Kingdom ............... 137/533.31

Primary Examiner—Robert G. Nilson
Attorney, Agent, or Firm—Michael J. Striker

[57] ABSTRACT

A vacuum breaker and pressure release valve for use with fuel storage tanks is disclosed which utilizes an intake check valve and an exhaust check valve to allow air to enter a tank from which fuel is being withdrawn by a pump while preventing air and volatized fuel from leaving the tank except during filling thereof. The check valves are formed by circular discs which can move upwardly and downwardly within cylindrical bores. In use, the invention permits a gasoline pump to operate without an opposed load caused by a vacuum within the tank which is being emptied, while preventing loss of fuel and pollution except when the tank is being filled.

6 Claims, 3 Drawing Figures

VACUUM BREAKER-PRESSURE RELEASE DEVICE

BACKGROUND OF THE INVENTION

This invention pertains to a valve which is designed for use with a fuel storage tank. Such tanks are conventionally attached to pumps which pump the fuels stored in the tank for delivery to a customer. If the tank is not vented to allow outside air to enter, a vacuum develops in the tank as fuel is withdrawn therefrom. As more and more fuel is pumped out of the tank, the pressure of the vacuum increases and thus the pump must operate against an ever-increasing load. Such a load results in a reduction in the service life of the pump and additionally results in a lessening of the rate of fuel delivery from the pump.

Thus, it is conventional practice to vent the storage tank to the atmosphere by means of a vent pipe which can allow air to enter the tank during the period when fuel is being withdrawn therefrom by the pump. However, the use of a vent pipe alone opens the interior of the tank to the atmosphere at all times.

Such fuels as gasoline have a high volatility, and thus gasoline in the storage tank can easily enter a low pressure vapor phase. In the event that a vent pipe alone is used to vent a storage tank which contains gasoline or another volatile fuel, the gasoline in the low pressure vapor phase will be free to leave the storage tank through the vent pipe. This phenomenon not only results in a loss of gasoline in the tank to the atmosphere, but also allows toxic hydrocarbons to pollute the atmosphere adjacent the vent pipe. This phenomenon is particularly acute where the storage tank is buried underground and a long vent pipe is used to vent the storage tank to the atmosphere. When such a long vent pipe is used, a high stack draft is developed which causes the gasoline in the low pressure vapor phase to be positively sucked out of the storage tank.

It would thus be desirable to provide a device which will allow the storage tank to be vented to the atmosphere during a withdrawal of fuel therefrom by a pump, but which would also prevent such venting in the event that the pump is not in use, to eliminate pollution problems and loss of fuel to the atmosphere.

SUMMARY OF THE INVENTION

It is thus the object of this invention to provide a device which can be attached to the vent pipe that vents a storage tank for fuels and the like to the atmosphere during withdrawal of the contents of the tank, while preventing such venting when the tank is not in the process of being emptied. Furthermore, it is an object of the invention to provide such a device which has a high resistance to the corrosive action of the gasses acting upon it, so as to have a long service life. A still further object of the invention is to provide a device of this type which is inexpensive to manufacture and which is simple in operation so as to reduce maintenance costs.

These objects, and others which will become apparent hereinafter, are achieved by the use of two check valves which can be attached to the vent pipe of a storage tank and which operate in opposite directions. One check valve, called an intake check valve, is designed to allow air to enter the tank through the vent pipe when the pressure inside the tank is reduced by operation of the pump, while preventing air from so entering when the pump is not in use. The other check valve, called an exhaust check valve, allows the interior of the tank to be vented to the atmosphere so as to allow the tank to be filled, while preventing such venting when the tank is not being filled. Although this invention does indeed allow toxic hydrocarbons to escape to the atmosphere during the filling process, such filling is relatively infrequent and thus the loss of fuel and the pollution released to the atmosphere is relatively low.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
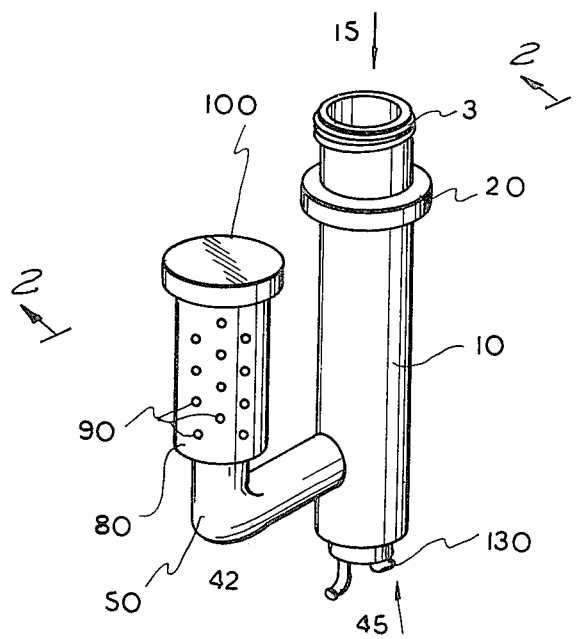
FIG. 1 is a perspective view of the invention.
Figure 2:
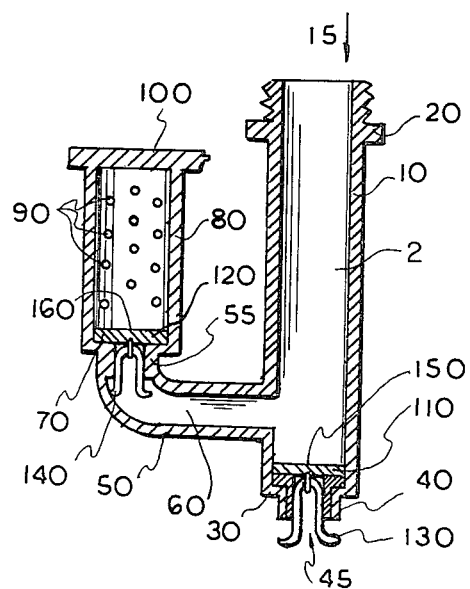
FIG. 2 is a cross-sectional view of the invention taken along the line 2—2 on FIG. 1.

In all the Figures, like elements are always indicated by like reference numerals regardless of the view in which the elements appear. A vertically elongated hollow cylindrical housing 10 has an interior 2, an annular peripheral flange 20 located near the top of the housing, and exterior threads 3 extending upwardly from flange 20 to the top of the housing 10. At the bottom of the housing, an annular peripheral valve seat 30 constricts the diameter of the housing, and a hollow vertical cylinder 40 is attached to the interior periphery of valve seat 30 and extends downwardly therefrom. The top end 15 of the housing 10 and the bottom end 45 of the cylinder 40 are open to the outside. A generally J-shaped pipe 50 extends radially outwardly from the housing 10 and then upwardly, parallel to the housing 10. The interior 60 of the pipe 50 communicates with the interior 2 of the housing 10. At the top of pipe 50, an annular valve seat 70 extends horizontally outwardly, and supports a hollow, cylindrical, and vertically elongated tube 80. Tube 80 has its top end closed off by a circular plate 100, and has perforations 90 in its wall.

An intake check valve disc 110 is located inside the interior 2 of the housing 10 adjacent the valve seat 30. Disc 110 is circular in shape, and has a diameter approximately 3/16 inch less than the interior diameter of interior 2 of the housing 10. Thus, disc 110 can move upwardly and downwardly within interior 2 of housing 10 under the influence of the forces acting upon it. In the event that the pressure at the top end 15 of the housing 10 is reduced because fuel is being withdrawn from the interior of a storage tank, the reduced pressure causes disc 110 to lift upwardly off valve seat 30. As a result of the clearance between the peripheral edge of the disc 110 and the surrounding housing, air can be drawn into lower end 45 of cylinder 40 and can pass into the tank. However, in the event that the pressure at top end 15 of housing 10 increases, the disc 110 will be forced downwardly against the valve seat 30 and thus no air or toxic hydrocarbons can escape past this disc 110. A U-shaped retaining clip 130 is attached to the bottom of disc 110 by a suitable screw 150. The clip is biased so as to press across a diameter of cylinder 40, so as to ensure that the disc 110, during movement, does not become tilted with respect to the horizontal. The lower ends of the clip 130 extend radially outwardly so as to engage the lowermost end of cylinder 40, so as to limit the vertical motion of disc 110 and thereby prevent it from being entirely withdrawn from the housing 10 and into a storage tank during use.

An exhaust check valve disc 120 rests, in a similar fashion, on valve seat 70. As before, there is approximately 3/16 inch clearance between the periphery of the disc 120 and the tube 80 which surrounds the disc 120. The disc 120 may move upwardly and downwardly within tube 80 under the influence of forces acting upon it. As before, a U-shaped retainer clip 140 is attached to the bottom of disc 120 by a suitable screw 160 or other device so as to limit upward travel of disc 120 within tube 80. A thickened portion 55 of the pipe 50, which thickened portion 55 extends radially inwardly towards the interior 60 of pipe 50, serves the same purpose as does cylinders 40, and allows the horizontal orientation of disc 120 to be maintained during movement thereof while preventing excessive vertical movement of disc 120 by abutment against the outwardly extending ends of clip 140.

An increased pressure at top end 15 of housing 10 will be reflected on the lower surface of disc 120, since the interior 60 of the pipe 50 and the interior 2 of housing 10 are in communication with each other. After the increased pressure at top end 15 exceeds a pre-determined threshold (i.e. overcomes the weight of the disc 120) the disc 120 can move upwardly within tube 80 and air can pass between disc 120 and tube 80 and out perforations 90 to the atmosphere. However, once the pressure at top end 15 of housing 10 is reduced, the disc 120 will drop downwardly against annular valve seat 70 and air is prevented from entering the interior 60 of the pipe 50.

Thus, disc 110 and valve seat 30 form an intake check valve which only allows air to enter the interior 2 of the housing, while disc 120 and valve seat 70 form an exhaust check valve which only allows gas of a pressure equal to or greater than a pre-determined threshold pressure to leave the interior 2 of housing 10.

Figure 3:
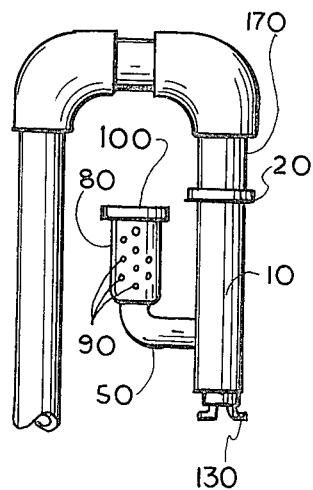
FIG. 3 is a side view of the invention installed on a vent pipe.

When, as is shown in FIG. 3, the threads 3 are threaded into a fitting 170 that is attached to a vent pipe V via intermediate 90° elbows F, and the vent pipe V is connected to a fuel storage tank (not shown), this device serves as a suitable vacuum breaker and pressure release valve. When the tank is beng filled, the pressure in the interior 2 of the housing 10 will increase sufficiently so as to force disc 120 upwardly and allow gas under pressure to escape via perforations 90 to the atmosphere. However, in the event that low pressure fuel in the vapor phase evaporates within the tank, the pressure of this fuel will be insufficient to cause disc 120 to move and thus such low-pressure vapor will be prevented from escaping from the tank to the atmosphere. Those skilled in the art will readily perceive that the proper weight of disc 120 can be determined once the volume of the tank, the likely temperatures of the tank and its contents and other relevant information such as the length of the vent pipe V are known.

This invention also allows the contents of such a tank to be easily withdrawn therefrom. In the event that fuel is pumped out of the tank, disc 110 will be lifted upwardly and air will thus be able to enter the tank to break any vacuum developed therein.

In order to provide sufficient corrosion resistance and a long and trouble-free service life, the valve seats 30 and 70 and the disc 110 and 120 may be advantageously manufactured of stainless steel, brass, bronze, and aluminum. If desired, the rest of the components of this device may also be manufactured of such materials, in order to further reduce corrosion during use.

It will be understood that each of the elements described above, or two or more together, may also find a useful application in other types of constructions differing from the types described above.

While the invention has been illustrated and described as embodied in "a vacuum breaker and pressure release valve for use with fuel storage tanks", it is not intended to be limited to the details shown, since various modifications and structural changes may be made without departing in any way from the spirit of the present invention.

I claim:

1. A valve for use with an air vent pipe of a storage tank which contains fluids in the liquid phase and in the low pressure vapor phase, the valve opening the pipe when the tank is being filled and emptied while keeping the pipe closed otherwise to permit the liquid fluid in the tank to be drawn off and replenished and prevent the vaporous fluid from escaping, comprising a housing with an interior and an exterior, the housing being securable to the pipe in a manner that the pipe communicates with the interior of the housing; an intake check valve arranged in the housing and operatively communicating with the interior and the exterior thereof, the intake check valve operating in a manner that air is permitted to enter the interior of the housing through the intake check valve while being prevented from leaving the interior of the housing through the intake check valve; and an exhaust check valve arranged in the housing and operatively communicating with the interior and the exterior thereof, the exhaust check valve operating in a manner that gas which exceeds a predetermined threshold pressure is permitted to leave the interior of the housing through the exhaust check valve, while gas of a pressure less than the predetermined threshold pressure is prevented from leaving the interior of the housing through the exhaust check valve and air is prevented from entering the interior of the housing through the exhaust check valve, said housing being a J-shaped one piece member having a first tubular portion bounding a first bore having an axis, a second tubular portion bounding a second bore having an axis which is parallel to the axis of said first bore, and a connecting tubular member bounding a third bore which extends between and communicates said first and second bores with one another, said first tubular member forming in said first bore a connecting opening which communicates with an air vent pipe of a storage tank and an air inlet opening through which air can enter said housing and which is coaxial with said connecting opening, said second tubular member forming in said second bore a gas outlet opening through which gas exceeding threshold pressure can leave said housing and which is formed by a plurality of perforations in a wall of said second tubular member.

2. The valve defined in claim 1 wherein the check valves include flat discs movable upwardly and downwardly in hollow bores formed in the housing.

3. The valve defined by claim 2, wherein each bore has a top and a bottom, and wherein each bore has an annular valve seat located at its bottom, whereby each disc may rest upon a corresponding valve seat to close the valve and may be lifted off the seat to open the valve.

4. The valve defined by claim 3, wherein each disc has a retaining clip secured thereto and extending downwardly through the corresponding valve seat.

5. The valve defined by claim 3 wherein the discs and valve seats are made of a material selected from the following list: aluminum, brass, bronze and stainless steel.

6. The valve defined in claim 1, wherein the check valves include flat discs movable upwardly and downwardly in said first and second bores, respectively, said first and second tubular members of said one piece housing forming in said first and second bores annular valve seats each provided for cooperation with a respective one of said flat discs.

* * * * *